(12) United States Patent
Knight et al.

(10) Patent No.: US 9,958,893 B2
(45) Date of Patent: May 1, 2018

(54) METHOD AND SYSTEM FOR ENABLING WIRELESS CONTROL IN TOOLS BY USE OF PORTABLE POWER SUPPLY SYSTEMS WITH EMBEDDED COMMUNICATION COMPONENTS

(71) Applicant: Sears Brands, L.L.C., Hoffman Estates, IL (US)

(72) Inventors: Colin Knight, Winnetka, IL (US); Iqbal Singh, Buffalo Grove, IL (US); Milos Coric, Lincolnshire, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 735 days.

(21) Appl. No.: 14/491,703

(22) Filed: Sep. 19, 2014

(65) Prior Publication Data
US 2016/0085253 A1    Mar. 24, 2016

(51) Int. Cl.
*G05B 15/02* (2006.01)
*G05F 1/66* (2006.01)
*G08C 17/02* (2006.01)

(52) U.S. Cl.
CPC ............... *G05F 1/66* (2013.01); *G05B 15/02* (2013.01); *G08C 17/02* (2013.01); *G08C 2201/10* (2013.01)

(58) Field of Classification Search
CPC ........... G05B 15/02; G05F 1/66; G08C 17/02; G08C 2201/10
USPC .......................................................... 700/19
See application file for complete search history.

(56) References Cited

U.S. PATENT DOCUMENTS

| | | | | |
|---|---|---|---|---|
| 5,598,039 A * | 1/1997 | Weber | ................. | G08C 23/00 307/140 |
| 2008/0206627 A1* | 8/2008 | Wright | ................. | G08C 17/02 429/93 |

FOREIGN PATENT DOCUMENTS

EP    1650879    4/2006

OTHER PUBLICATIONS

Extended European Search Report for EP15185473, dated Feb. 26, 2016 (7 pages).

* cited by examiner

*Primary Examiner* — Yuhui R Pan
(74) *Attorney, Agent, or Firm* — McAndrews, Held & Malloy, Ltd.

(57) ABSTRACT

Methods and systems are provided for enabling wireless control by use of portable power supply systems with embedded communication components. A power supply component, which is operable to store and discharge power, and which may be configured for use in a first device to supply power thereto in portable manner, may be configured to determine data associated with the power supply component. The data may comprise information relating to one or more conditions associated with use of power stored in the power supply component, in conjunction with operation of the first device. The power supply component may comprise a communication element, for wirelessly communicating messages to a second device that is physically separate from the first device, to control at least part of operations of the second device. Controlling operations of the second device may comprise activating or deactivating the second device based on use of power by the first device.

20 Claims, 4 Drawing Sheets

METHOD AND SYSTEM FOR ENABLING WIRELESS CONTROL IN TOOLS BY USE OF PORTABLE POWER SUPPLY SYSTEMS WITH EMBEDDED COMMUNICATION COMPONENTS

TECHNICAL FIELD

Aspects of the present application relate to power supplies and communications. More specifically, certain implementations of the present disclosure relate to use of enabling wireless control in tools by use of portable power supply systems with embedded communication components.

BACKGROUND

Existing methods and systems, if any exist, for controlling secondary systems by primary systems based on power supply subsystems of the primary systems are costly, cumbersome and inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

System(s) and/or method(s) are provided for enabling wireless control in tools by use of portable power supply systems with embedded communication components, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

As utilized herein the terms "circuits" and "circuitry" refer to physical electronic components ("hardware") and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
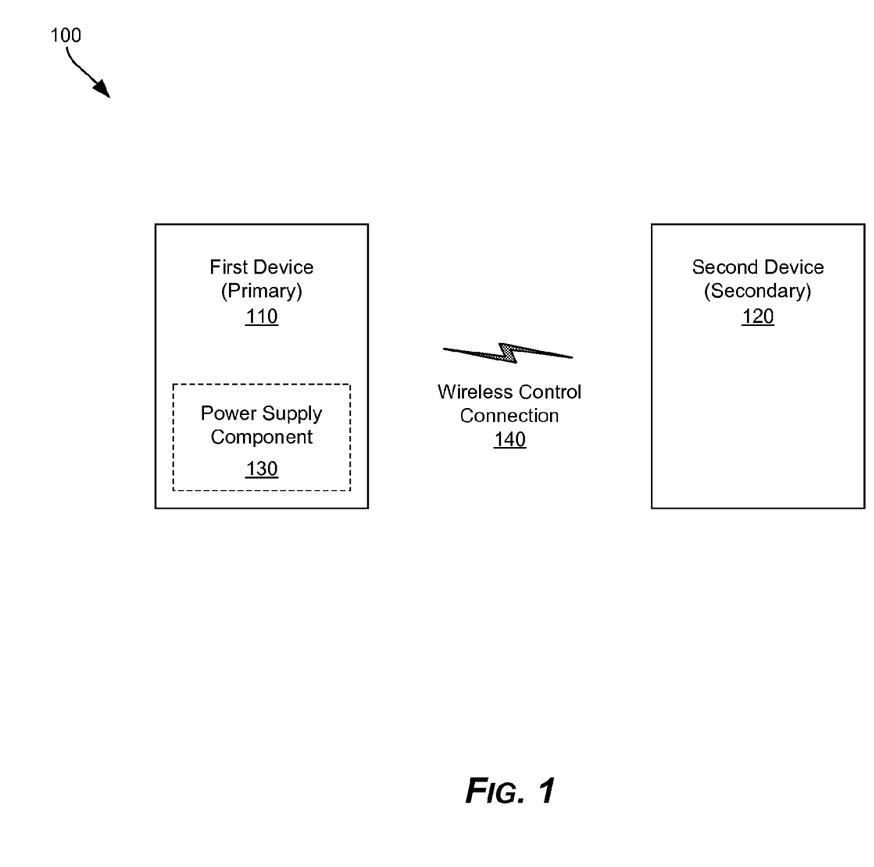
FIG. 1 illustrates an example setup that supports use of portable power supply systems with embedded communication components for enabling wireless control.

FIG. 1 illustrates an example setup that supports use of portable power supply systems with embedded communication components for enabling wireless control. Shown in FIG. 1 is a setup 100, which may be configured to support enabling wireless control in tools by use of portable power supply systems with embedded communication components.

The setup 100 may comprise a first device 110 and a second device 120. Each first device 110 and the second device 120 may correspond to any device (or system) that may be used to perform one or more particular functions or operations. The first device 110 and the second device 120 may be particularly suited for working in conjunction with one another. For example, the first device 110 may comprise a drilling or sawing tool and the second device 120 may comprise a vacuum or other similar debris collection tool. Thus, when the first device 110 is being used (e.g., to drill or saw), it may be desirable to also use the second device 120 (e.g., to collect drilling/sawing debris).

Accordingly, in some instances (e.g., coordinated use scenarios) it may be desirable to allow devices to control other devices, and to do so in convenient and safe manner. For example, it may be desirable to provide means for ensuring that the second device 120 is controlled based on the operation of the first device 110. In particular, it may advantageous to enable, for example, activating (or powering on) and/or deactivating (or powering off) the second device 120 based on active use (or not) of the first device 110, respectively. Doing so may require incorporating control and/or communication resources into the devices. For example, the first device 110 may need to incorporate control logic to monitor its operations (to determine when to activate/deactivate the second device 120), and/or communication components (e.g., transceiver and related circuitry) to enable establishing connection to the second device 120 and communication therewith. Further, in some instances connectivity and communication between the devices may be done wirelessly. Such wireless connectivity and communication may be desirable as it may allow the devices to control one another remotely, and may obviate the need for use of wired (e.g., via cords or cables) connection which may be undesirable—e.g., for posing safety concerns in certain use environments. Adding such resources may not be desirable, however, as it may unnecessarily add cost or complexity.

Accordingly, in various implementations, remote wireless control may be provided in devices without requiring changes or modifications to the devices themselves (e.g., addition of resources or alteration of operations thereof). For example, devices may typically require power, which may be obtained from power sources. Power sources may include, in some instance, portable power supply components (e.g., batteries or the like). For example, the first device 110 may incorporate support for use a portable power supply component (e.g., battery) which may be inserted into the first device 110 (or otherwise connected thereto) to supply it with power. Thus, to enable remote wireless control by the first device 110, of the second device 120, without requiring changes or modifications to the first device 110, a modified power supply component 130 may be used. In particular, the power supply component 130 may comprise, in addition to power storage resources, additional components (e.g., hardware, software, circuitry, etc.) that are particularly configured to provide functions required for enabling the remote wireless control of the second device 120. Further, by designing the power supply component 130 for use as conventional power supply components (e.g., being designed to be inserted into or otherwise connected to the first device 110 in the same manner a conventional power supply component, such as a conventional battery, would be), the added functionality may be provided without requiring any change to the manner by which power is supplied to the first device 110. In other words, a typical battery or battery pack of the first device 110 can be replaced with the modified power supply component 130, thereby enabling a previously "dumb" tool to operate and communicate in a manner described in accordance with the present disclosure.

For example, the power supply component 130 may incorporate control and monitoring circuitry and wireless transceiver, which may be embedded within the power supply component 130 (e.g., within a battery-like packaging thereof). In this regard, the control and monitoring circuitry may monitor power use in the first device 110 (e.g., based on whether or not power is being drawn from the power supply component 130), and may setup a control connection 140 to the second device 120 to enable controlling its operations based on operations of the first device 110. Thus, when the first device 110 is activated (power or turned on), the power supply component 130 may sense that by detecting that power is being drawn from it, and may remotely (wirelessly) activate the second device 120. Similarly, when the first device 110 is deactivated (power or turned off), the power supply component 130 may sense that by detecting that power is not being drawn from it, and may remotely (wirelessly) deactivate the second device 120. Thus, where operations of a device (e.g., the first device 110) require use of other devices (e.g., the second device 120), use of the power supply component 130 may eliminate the need to manually control both devices at the same time. Rather, the power supply component 130 enable controlling secondary devices automatically and wirelessly. An example implementation of the power supply component 130 is described in more detail below (e.g., with respect to FIG. 2).

Figure 2:
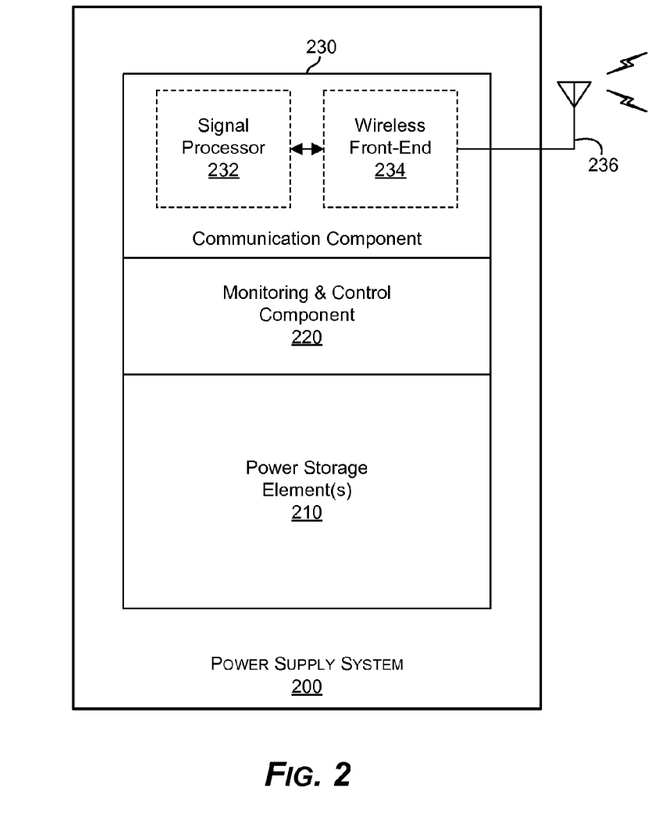
FIG. 2 illustrates an example power supply system with an embedded communication component for enabling wireless control.

FIG. 2 illustrates an example power supply system with an embedded communication component for enabling wireless control. Shown in FIG. 2 is a power supply system 200, which may be configured to enable wireless control by devices (e.g., tools) in which the power supply system 200 is inserted (or to which the power supply system 200 may be otherwise connected).

The power supply system 200 may comprise suitable physical components and circuitry for implementing various aspects of the present disclosure. In particular, the power supply system 200, as used herein, may be configured for supplying power in portable manner—that is, it obviates the need to connect a device or tool in which the power supply system 200 is inserted (or to which the power supply system 200 is otherwise connected). Further, the power supply system 200 may be configured for supporting various functions or operations relating to its function as a power source to a corresponding device/tool. In particular, the power supply system 200 may be configured to support functions or operations relating to use of the power supply system 200 to enable a device/tool in which it is inserted (or to which the power supply system 200 is otherwise connected) to wirelessly control other devices. Example of such functions or operations may comprise monitoring of power use, wireless communication, etc.

In various implementations, the power supply system 200 may be configured or implemented as a battery or a battery-like device—that is being particularly designed or configured to be used in the same manner as typical batteries would be used—e.g., being implemented such that it may be used in the same manner that a non-reusable or rechargeable (e.g., lithium-ion (Li-ion)) batteries are used. Further, to maintain suitable packaging, the power supply system 200 may further comprise suitable circuitry embedded within it (e.g., within the 'battery' packaging) for supporting the various related functions or operations needed to allow use of the power supply system 200 to enable the corresponding device/tool to wirelessly control other devices/tools. Thus, the power supply system 200 may be packaged such that it would fit in the same space and/or in the same manner as a typical battery would have been used in the intended device/tool. The disclosure, however, is not limited to any particular type or design of rechargeable batteries, and power supply system 200 may be configured such that it may be packaged such that it may be used in the same manner as any typical battery (or any portable power source/supply device) would have been used.

In the example implementation depicted in FIG. 2, the power supply system 200 may comprise one or more power storage elements 210, a monitoring and control component 220, and a communication component 230.

Each power storage element 210 may be operable to store (when the power supply system 200 is charged or recharged) power, and may be operable to output stored power (e.g., when the power supply system 200 is inserted into or otherwise connected to a suitable device or system, to supply power to components thereof). In this regard, various technologies, designs and/or implementations may be used in portable power supply systems (e.g., the power supply system 200), and/or power storage elements (e.g., the power storage elements 210). For example, the power supply system 200 (or the power supply system elements 210 thereof) may be implemented based on electrochemical rechargeable design, in which the charging (and recharging) may be achieved by storing electric power based on converting of applied electrical power (e.g., applied as current) into chemical energy, and the discharging (to output electric power) may be done based on converting of the stored chemical energy back into electrical power. The disclosure, however, is not limited to any particular type or design of rechargeable power storage/supply systems (or elements).

The monitoring and control component 220 may comprise suitable circuitry for monitoring and/or managing the power supply system 200, and/or various functions or parameters related thereto. For example, the monitoring and control component 220 may be configured for monitoring power use in monitoring and control component 220, and/or for making determinations or executing tasks based on such monitoring. For example, monitoring and control component 220 may be operable to monitor when power is being drawn from the power supply system 200, and/or to determine the rate of such power use. The monitoring and control component 220 may be particularly configured such that it may be implemented as an embedded component of the power supply system 200 in such a manner to allow maintaining suitable packaging of the system (e.g., as 'battery' like device). In an example implementation, the monitoring and control component 220 may be implemented as printed circuit board (PCB) based component, particularly in a manner that may allow embedding the monitoring and control component 220 within the power supply system 200.

The communication component 230 may comprise suitable circuitry for supporting communication of data to and/or from the power supply system 200. In particular, the communication component 230 may be configured to enable wireless communications by the power supply system 200. For example, the communication component 230 may comprise a signal processor 232 and a wireless front-end 234. The signal processor 232 may comprise suitable circuitry for processing signals transmitted and/or received by the power supply system 200, in accordance with one or more wireless interfaces and/or protocols supported by the power supply system 200 (e.g., WiFi, Bluetooth, ZigBee, NFC, etc.). Nonetheless, it should be understood that disclosure is not limited to any particular wireless interface or protocol.

The signal processor 232 may be operable to perform such signal processing operations as filtering, amplification, up-conversion/down-conversion of baseband signals, analog-to-digital conversion and/or digital-to-analog conversion, encoding/decoding, encryption/decryption, and/or modulation/demodulation.

The wireless front-end 234 may comprise circuitry for performing wireless transmission and/or reception (e.g., via one or more antennas 236), such as over a plurality of supported RF bands. The one or more antennas 236 may be configured for supporting over-the-air transmission and/or reception of wireless signals, such as within certain bandwidths and/or in accordance with one or more wireless interfaces supported by the power supply system 200.

In some instances, the communication component 230 may also support wired connections, such as by incorporating suitable wired front-end circuitry for performing wired based transmission and/or reception, such as over a plurality of supported physical wired media. The communication component 230 may support communications of RF signals via the plurality of wired connectors, within certain bandwidths and/or in accordance with one or more wired protocols (e.g., USB) supported by the power supply system 200.

The communication component 230 may be particularly configured such that it may be implemented as embedded component of the power supply system 200 in a manner to allow maintaining suitable packaging of the system (e.g., as 'battery' like device). In an example implementation, the communication component 230 may be implemented as printed circuit board (PCB) based component, particularly in a manner that may allow embedding the communication component 230 within the power supply system 200. Also, while the antenna(s) 236 are depicted in FIG. 2 as being outside the communication component 230, the antenna(s) 236 may be implemented such that to also allow maintaining suitable packaging of the power supply system 200 (e.g., as 'battery' like device). Thus, the antenna(s) 236 may be embedded within the power supply system 200 (and/or within its packaging).

In operation, the power supply system 200 may be used to store and/or supply power. For example, the power supply system 200 may be configured to initially store power, and then subsequently supply, when needed, at least some of the stored power. The power supply system 200 may be utilized as power component in various different types of systems and/or setups. For example, the power supply system 200 may be utilized in tools, to enable powering these tools, particularly in lieu of needing to connect them to conventional power supply sources (e.g., electric outlets). The use of power supply system 200 is not limited, however, to any particular type of systems and/or setups, or to any particular use scenario; and it should be understood that the power supply system 200 may be utilized in a substantially similar manner as described herein in any suitable system, setup, and/or scenario where wireless (or cordless) control (by a device/tool which the power supply system 200 is used in powering) of secondary devices (e.g., other tools) may be required or desirable.

The power supply system 200 may be implemented as a rechargeable based system—i.e. can be configured to draw and store power, and to convert power—e.g., AC to DC and vice versa—if necessary. The stored power may be drawn from, for example, external power sources (e.g., power outlets, external auxiliary power devices etc.), such as when it is possible to connect (e.g., using suitable power cables) to these power sources.

The power stored in the power supply system 200 may be outputted, such as via power connections (not shown), to various components of the system/setup in which the power supply system 200 is inserted (or to which the power supply system 200 is or otherwise connected), to supply power that is required by components during operations thereof (e.g., when no external power supply is available). Once power in the power supply system 200 is depleted (e.g., to a safe level), the power supply system 200 may be recharged, in the same manner—e.g., from external sources and/or internal sources in the system/setup in which the power supply system 200 is installed.

In some instances, the power supply system 200 may be operable to provide additional functions for supporting operations of the power supply system 200. For example, the power supply system 200 may comprise dedicated hardware and/or software components for monitoring parameters of the power supply system 200 (e.g., power level) and/or managing power operations in the battery, for providing (feedback) information related thereto (e.g., to centralized control components in the system/setup in which the power supply system 200 is installed), and/or to performed certain functions based on that monitoring. For example, the monitoring and control component 220 may be operable to monitor parameters and/or conditions relating to use of the power supply system 200. The monitoring and control component 220 may be operable to monitor, detect or determine, for example, when power is drawn from the power supply system 200; when drawing of power is ceased (and/or subsequently resumed); available power supply; need for recharge; and the like. Further, the monitoring and control component 220 may be operable to generate data relating to monitored parameters and/or conditions. The data may comprise, for example, indications, alarms, or the like.

Further, as noted above these components may be configured in a manner that does not affect the packaging of the system, such as by being embedded within the overall, battery-like packaging of the power supply system 200. In various use scenarios, the power supply system 200 may be utilized to render a device (e.g., tool) to which the power supply system 200 is used in powering capable of controlling operations of other devices (e.g., other tools), and to particularly do so in wireless manner (thus obviating the need for cabling or other cord-like based connectivity between the devices). For example, the power supply system 200 may be operable to support wireless communication, such as via the communication component 230 for example. In this regard, the communication component 230 may be utilized in locating other devices that may be intended for pairing therewith (e.g., using suitable search mechanisms); and/or in setting up and/or utilizing connections that may be used in communicating signals (e.g., carrying data) between the power supply system 200 and these devices.

These additional functions provided by the power supply system 200—e.g., monitoring and communication related functions, may be used to enhance operation of the device which the power supply system 200 is used in powering. In particular, the power supply system 200 may be operable to particularly enhance operation of the device based on the power use associated with the power supply system 200. For example, the power supply system 200 may be operable to enable wireless (or cordless) control in devices lacking communication and/or control resources, thus obviating the need to add these resources (which may add cost and/or complexity). Accordingly, the power supply system 200 may be used in a primary device lacking such resources (e.g., drilling tool) in lieu of typical power supply sources, to both provide power in portable manner (e.g., cordlessly) and to allow wireless control by that device of other devices (e.g., a vacuum or similar debris collection tools), the use of which in conjunction with operation of the primary device be required or desirable. Example use scenarios are described in more detail below.

Figure 3:
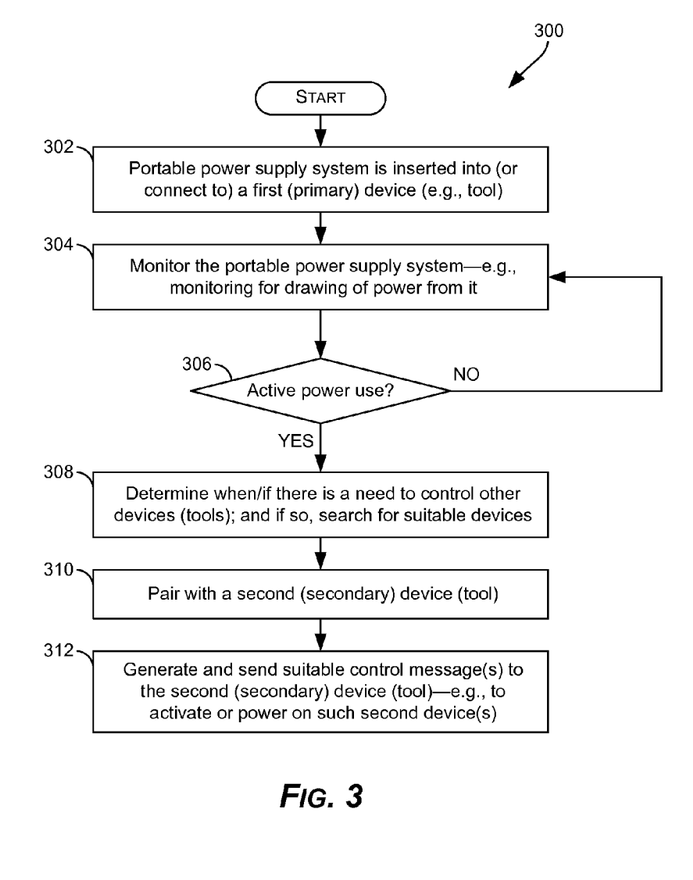
FIG. 3 is a flowchart illustrating an example process for wireless activation of secondary tools by a primary tool based on use of portable power supply systems with embedded communication components.

FIG. 3 is a flowchart illustrating an example process for wireless activation of secondary tools by a primary tool based on use of portable power supply systems with embedded communication components. Shown in FIG. 3 is a flow chart 300, comprising a plurality of example steps, which may be performed in a system (e.g., the power supply system 200 of FIG. 2) to provide and/or support wireless activation of secondary tool(s) by use of portable power supply systems, with embedded communication components, in a primary tool.

In step 302, a portable power supply system configured in accordance with the present disclosure may be inserted into (or connected to) a first (primary) device (e.g., a drilling or sawing tool).

In step 304, monitoring of the portable power supply system may be initiated. In particular, the monitoring may comprise monitoring for and/or detecting one or more conditions relating to the power supply system and use thereof, and/or generating data based thereon. For example, the portable power supply may be monitoring for drawing of power therefrom. The monitoring may be performed by monitoring components or resources embedded in the portable power supply system.

In step 306, a check for active power use (e.g., when power is being drawn from the portable power supply system) may be performed. In instances where it is determined that there is no active power use, the process may loop back to step 304, to continue monitoring. In instances where it is determined that there is active power use (that is power is being drawn), the process may proceed to 308.

In step 308, it may be determined when/if there is a need to control other devices; and if so, a search for suitable candidate devices, to pair with and control as secondary devices (tools), may be performed. For example, the determination of the need for controlling other devices may be based on the type of the first (primary) device, and/or based on the type of (current) operation of the first (primary) device. Similarly, the search for suitable candidate devices may be performed in adaptive manner—e.g., based on the type of the first (primary) device, and/or based on the type of (current) operation of the first (primary) device. The determination of the need for secondary devices and/or the search for candidate devices may be based on preconfigured information (e.g., stored in memory in the first device or in the portable power supply system), based on real-time user input, or the like. For example, when the first device is a drilling or sawing tool, and the tool is being actively used (to drill or saw), it may be determined that vacuums or other debris collection tools would be desired, and a search for suitable candidates (e.g., tools capable of collecting the type of debris being created) may be done.

In step 310, the portable power supply system may pair, using an embedded communication component thereof, with each suitable second (secondary) device (tool) that is located within operation proximity. The pairing comprises establishing wireless connection (e.g., Bluetooth, WiFi, NFC, etc.).

In step 312, the portable power supply system may generate and send, using the embedded communication component thereof, suitable control message(s) to the second (secondary) device (tool)—e.g., to activate or power on such second device(s). In some instances, the second (secondary) devices may respond to initiation of active power use in adaptive manner. For example, when notified that the first (primary) device initiated active power use, rather than immediately activating or powering on, a second (secondary) device may wait a particular period time. This may be particularly suitable in instances where it may be desirable to have second (secondary) device delay start of its operation for some time—e.g., where the first device is a drilling tool, and the second device is a vacuum, it may be desirable to have the vacuum delay its start since debris may not be generated by the drilling tool immediately. In some instances, the control message may be specifically configured to cause such adaptive response—e.g., by incorporating information specifying how to response (e.g., delay the activation) and/or providing information relating thereto (e.g., duration of wait-time). Alternatively, the second (secondary) devices may be configured to respond in such adaptive manner without requiring specific information in the control messages. The control messages (and information used therein) may be based on preconfigured data (e.g., stored in memory in the first device or in the portable power supply system), based on real-time user input, or the like.

Figure 4:
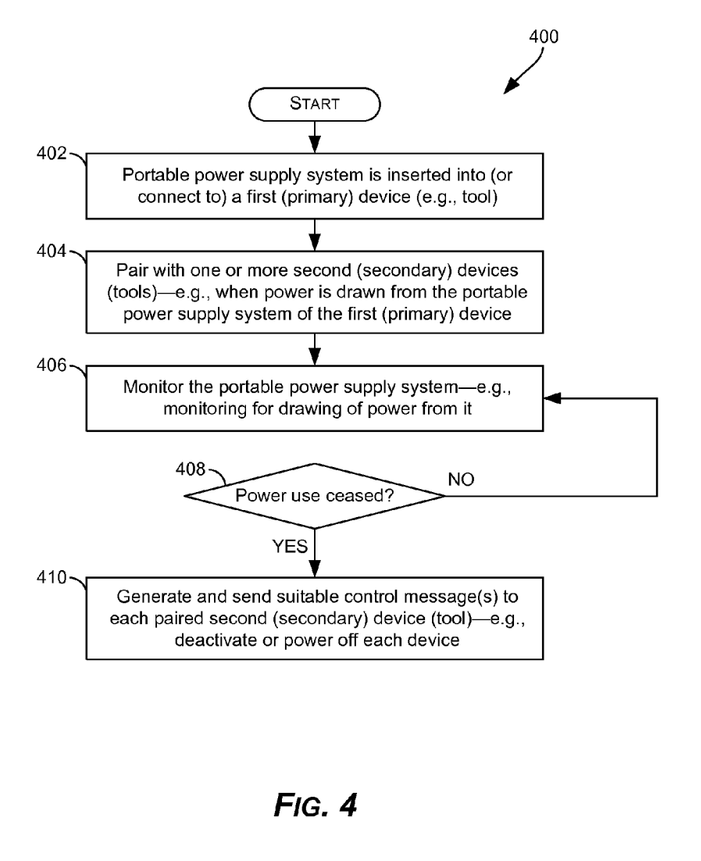
FIG. 4 is a flowchart illustrating an example process for wireless deactivation of secondary tools by a primary tool based on use of portable power supply systems with embedded communication components.

FIG. 4 is a flowchart illustrating an example process for wireless deactivation of secondary tools by a primary tool based on use of portable power supply systems with embedded communication components. Shown in FIG. 4 is a flow chart 400, comprising a plurality of example steps, which may be performed in a system (e.g., the power supply system 200 of FIG. 2) to provide and/or support wireless deactivation of secondary tool(s) by use of portable power supply systems, with embedded communication components, in a primary tool.

In step 402, a portable power supply system configured in accordance with the present disclosure may be inserted into (or connected to) a first (primary) device (e.g., a drilling or sawing tool).

In step 404, the portable power supply system may pair the first (primary) device with one or more second (secondary) devices (tools), such as during active use of first (primary) device. For example, the pairing with second (secondary) devices (tools), may be done when power is drawn from the portable power supply system of the first (primary) device, in a similar manner as described with respect to FIG. 3 (e.g., in steps 308-312).

In step 406, the portable power supply system may be monitored. In particular, as noted above, the monitoring may comprise monitoring for and/or detecting one or more conditions relating to the power supply system and use thereof, and/or generating data based thereon. For example, the portable power supply system may be monitoring for (continued) use of power from the portable power supply system. The monitoring may be performed by monitoring components or resources embedded in the portable power supply system.

In step 408, a check for cessation of active power use (e.g., when drawing of power from the portable power supply system is ceased) may be performed. In instances where it is determined that there is no cessation of power use (i.e., active power use continues), the process may loop back to step 406, to continue monitoring. In instances where it is determined that there is cessation of power use (that is power is no longer being drawn), the process may proceed to 410.

In step 410, the portable power supply system may generate and send, using the embedded communication component thereof, suitable control message(s) to at least some of the second (secondary) devices (tools) paired with the first (primary) device, based on the cessation of active power use by the first (primary) device. For example, the control messages may be configured to deactivate or power off one or more second (secondary) devices. Further, in some instances, the second (secondary) devices may be configured to respond to the control messages in adaptive manner. For example, rather than immediately deactivating or powering off when notified that the first (primary) device ceased active power use, a second (secondary) device may deactivate or power off after particular period time. This may be particularly suitable in instances where it may be desirable to have second (secondary) device continuing to operate for some time—e.g., where the first device is a drilling tool, and the second device is a vacuum, it may be desirable to have the vacuum continue run for some time (e.g., 20 seconds) after the drilling tool stopped. In some instances, the control message may be specifically configured to cause such adaptive response—e.g., by incorporating information specifying how to response (e.g., delay the deactivation) and/or providing information relating thereto (e.g., duration of wait-time). Alternatively, the second (secondary) devices may be configured to respond in such adaptive manner without requiring specific information in the control messages. The control messages (and information used therein) may be based on preconfigured data (e.g., stored in memory in the first device or in the portable power supply system), based on real-time user input, or the like. Further, once the control messages are sent, the portable power supply system may terminate, using embedded communication component thereof, connections previously setup with the second (secondary) device(s).

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for enabling wireless control in tools by use of portable power supply systems with embedded communication components.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form. Accordingly, some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:
identifying, in a power supply component configured for use in a first device to supply power thereto in portable manner, a second device that is physically separate from the first device;
pairing, via a communication element embedded within the power supply component, the first device with the second device;
determining by the power supply component, data associated with the power supply component, wherein the data comprises information relating to one or more conditions associated with use of power stored in the power supply component, in conjunction with operation of the first device;
generating based on the data, one or more messages, wherein:
the one or more messages are configured for indicating when the first device is actively being used;
the one or more messages are configured for adaptively controlling at least part of operations of the second device; and
the one or more messages specify a duration of wait time for a response operation of the second device; and wirelessly communicating, by the communication element, the one or more messages to the second device to control the second device based on the operation of the first device.

2. The method of claim 1, wherein the information comprises a real-time indication of use of power stored in the power supply component.

3. The method of claim 1, wherein the one or more conditions comprise drawing power from the power supply component when operating the first device.

4. The method of claim 3, wherein the one or more messages comprise at least one message relating to controlling the second device based on the first device being operated.

5. The method of claim 4, wherein the at least one message is configured to activate or power on the second device when the first device is operated.

6. The method of claim 1, wherein the one or more conditions comprise ceasing to draw power from the power supply component when operating the first device is ceased.

7. The method of claim 6, wherein the one or more messages comprise at least one message relating to controlling the second device based on the first device ceasing to operate.

8. The method of claim 7, wherein the at least one message is configured to deactivate or power off the second device when the first device ceases to operate.

9. The method of claim 1, wherein the power supply component comprises a battery, and the communication element comprises a wireless transmitter incorporated into the battery packaging.

10. The method of claim 9, wherein the wireless transmitter is configured into a Printed Circuit Board (PCB).

11. A system, comprising:
a power supply component configured for use in a first device to supply power thereto in portable manner; the power supply component comprising:
one or more power storage element operable to store and discharge power; and
one or more circuits operable to:
identify a second device that is physically separate from the first device;
pair the first device with the second device;
determine data associated with the power supply component, wherein the data comprises information relating to one or more conditions associated with use of power stored in the power supply component, in conjunction with operation of the first device;
generate based on the data, one or more messages, wherein:
the one or more messages are configured for indicating when the first device is actively being used;
the one or more messages are configured for adaptively controlling at least part of operations of a second device that is physically separate from the first device; and
the one or more messages specify a duration of wait time for a response operation of the second device; and
wirelessly communicate the one or more messages to the second device to control the second device based on the operation of the first device.

12. The system of claim 11, wherein the information comprises a real-time indication of use of power stored in the power supply component.

13. The system of claim 11, wherein the one or more conditions comprise drawing power from the power supply component when operating the first device.

14. The system of claim 13, wherein the one or more messages comprise at least one message relating to controlling the second device based on the first device being operated.

15. The system of claim 14, wherein the at least one message is configured to activate or power on the second device when the first device is operated.

16. The system of claim 11, wherein the one or more conditions comprise ceasing to draw power from the power supply component when operating the first device is ceased.

17. The system of claim 16, wherein the one or more messages comprise at least one message relating to controlling the second device based on the first device ceasing to operate.

18. The system of claim 17, wherein the at least one message is configured to deactivate or power off the second device when the first device ceases to operate.

19. The system of claim 11, wherein the power supply component comprises a battery, and the one or more circuits comprise a wireless transmitter incorporated into the battery packaging.

20. The system of claim 11, wherein the one or more circuits are configured into a Printed Circuit Board (PCB).

* * * * *